(12) United States Patent
Nakatsugawa et al.

(10) Patent No.: US 12,510,064 B2
(45) Date of Patent: Dec. 30, 2025

(54) LINEAR MOTOR, COMPRESSOR EQUIPPED WITH LINEAR MOTOR, REFRIGERATOR EQUIPPED WITH COMPRESSOR, AND VEHICLE AIR SUSPENSION EQUIPPED WITH COMPRESSOR

(71) Applicant: Hitachi Astemo, Ltd., Hitachinaka (JP)

(72) Inventors: Junnosuke Nakatsugawa, Tokyo (JP); Masaki Koyama, Tokyo (JP); Hiroshi Sakai, Hitachinaka (JP); Kan Kobayashi, Hitachinaka (JP); Yoshinori Kawai, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 71 days.

(21) Appl. No.: 18/569,380

(22) PCT Filed: May 18, 2022

(86) PCT No.: PCT/JP2022/020693
§ 371 (c)(1),
(2) Date: Dec. 12, 2023

(87) PCT Pub. No.: WO2023/286448
PCT Pub. Date: Jan. 19, 2023

(65) Prior Publication Data
US 2024/0287974 A1    Aug. 29, 2024

(30) Foreign Application Priority Data

Jul. 14, 2021    (JP) .................................. 2021-116215

(51) Int. Cl.
*F04B 17/03*    (2006.01)
*F25B 1/02*    (2006.01)
(Continued)

(52) U.S. Cl.
CPC ................. *F04B 17/03* (2013.01); *F25B 1/02* (2013.01); *F25B 31/023* (2013.01); *H02K 33/16* (2013.01)

(58) Field of Classification Search
CPC .......... F04B 17/03; F25B 1/02; F25B 31/023; H02K 33/16
See application file for complete search history.

(56) References Cited

U.S. PATENT DOCUMENTS 6,326,706 B1 * 12/2001 Zhang .................... F04B 35/045
310/12.32
6,674,186 B2 * 1/2004 Yajima .................... H02K 41/03
310/12.25
(Continued)

FOREIGN PATENT DOCUMENTS

JP    2018-064412 A    4/2018
JP    2019-154141 A    9/2019
(Continued)

OTHER PUBLICATIONS

International Search Report, PCT/JP2022/020693, Jul. 26, 2022, 2 pgs.
(Continued)

*Primary Examiner* — Christopher S Bobish
(74) *Attorney, Agent, or Firm* — Volpe Koenig

(57) ABSTRACT

A linear motor for a compressor having asymmetric load characteristics in both directions of a stroke, improves the service life of a bearing, and reduces a total length of a system. The linear motor includes a movable element having a magnetic pole frame and a plurality of field element poles, and a plurality of magnetic pole teeth around which windings are wound and that are provided so as to sandwich the movable element, and the movable element and the magnetic pole teeth are relatively displaced. The plurality of field element poles include primary magnets arranged between
(Continued)

the plurality of magnetic pole teeth and secondary magnets arranged externally relative to spaces between the plurality of magnetic pole teeth in either direction of the relative displacement. A neck part of the magnetic pole frame connected to a bearing is arranged externally in the other direction of the relative displacement direction.

10 Claims, 12 Drawing Sheets

(51) Int. Cl.
*F25B 31/02* (2006.01)
*H02K 33/16* (2006.01)

(56) References Cited

U.S. PATENT DOCUMENTS

| | | | | |
|---|---|---|---|---|
| 8,076,804 B2* | 12/2011 | Jajtic | ................... | H02K 41/031 |
| | | | | 310/12.01 |
| 8,102,085 B2* | 1/2012 | Jajtic | ................... | B23B 29/125 |
| | | | | 310/12.24 |
| 8,502,423 B2* | 8/2013 | Shikayama | ............ | H02K 41/03 |
| | | | | 310/12.25 |
| 8,810,082 B2* | 8/2014 | Aoyama | ................ | H02K 41/03 |
| | | | | 310/12.25 |
| 8,922,069 B2* | 12/2014 | Iwaki | ................... | H01F 7/1615 |
| | | | | 310/23 |
| 9,059,626 B2* | 6/2015 | Sugita | .................... | H02K 33/16 |
| 9,281,735 B2* | 3/2016 | Gandhi | ................ | H02K 41/033 |
| 9,379,599 B2* | 6/2016 | Tang | ................ | H02K 1/2713 |
| 10,727,727 B2* | 7/2020 | Aoyama | ............. | H02K 41/031 |
| 10,766,330 B2* | 9/2020 | Seto | ................... | B60G 17/0424 |
| 11,211,858 B2* | 12/2021 | Koyama | ............... | F04B 35/045 |
| 11,296,587 B2* | 4/2022 | Trumper | .............. | H02K 41/031 |
| 11,401,924 B2* | 8/2022 | Hotta | .................... | F04B 35/045 |
| 2015/0001969 A1 | 1/2015 | Aoyama et al. | | |
| 2019/0356207 A1* | 11/2019 | Koyama | ............... | F04B 35/045 |

FOREIGN PATENT DOCUMENTS

| | | |
|---|---|---|
| JP | 2020-031483 A | 2/2020 |
| JP | 2021-002954 A | 1/2021 |
| WO | 2013/124875 A1 | 8/2013 |
| WO | 2015/177883 A1 | 11/2015 |
| WO | 2018/070278 A1 | 4/2018 |

OTHER PUBLICATIONS

Japanese Office Action issued on Dec. 3, 2024 for Japanese Patent Application No. 2021-116215.

\* cited by examiner

LINEAR MOTOR, COMPRESSOR EQUIPPED WITH LINEAR MOTOR, REFRIGERATOR EQUIPPED WITH COMPRESSOR, AND VEHICLE AIR SUSPENSION EQUIPPED WITH COMPRESSOR

TECHNICAL FIELD

The present invention relates to a linear motor, a compressor equipped with the linear motor, a refrigerator equipped with the compressor, and a vehicle air suspension equipped with the compressor.

BACKGROUND ART

A linear motor, which is a thrust generation mechanism, causes a movable element to generate thrust by a magnetic force acting between magnetic poles formed in a stator and the movable element. As a background art of the present technical field, linear motors described in JP 2019-154141 A (PTL 1) and JP 2018-64412 A (PTL 2) are known.

In each of the linear motors, two magnetic pole tooth sets each including two magnetic pole teeth facing each other with a space interposed therebetween in a top-bottom direction are arranged in a front-rear direction to constitute a stator. In PTL 1, three permanent magnet magnetic poles are arranged in a front-rear direction between upper and lower magnetic pole teeth to constitute a movable element. In PTL 2, two permanent magnet magnetic poles and one soft magnetic pole are arranged in a front-rear direction between upper and lower magnetic pole teeth to constitute a movable element. One of ends of the three movable element magnetic poles is made of a soft magnetic material, so that the thrust characteristics in the front direction and the rear direction are asymmetric. This motor is used in combination with a compressor having asymmetric load characteristics in both directions of a stroke.

CITATION LIST

Patent Literatures

PTL 1: JP 2019-154141 A
PTL 2: JP 2018-64412 A

SUMMARY OF INVENTION

Technical Problem

In each of the linear motors of PTL 1 and PTL 2, three movable element magnetic poles are arranged with respect to two armature magnetic poles arranged in the traveling direction of the movable element. In PTL 1, all of the three movable element magnetic poles are formed of permanent magnets, whereas in PTL 2, a part of the three movable element magnetic poles is formed of a soft magnetic material. In each of the cases, a part of the movable element magnetic poles at both ends protrudes outward from the ends of the armature magnetic poles, and a piston is connected to one movable element end portion via a connection portion. Therefore, the length of the entire movable element becomes long, and a total length of a compressor system including the piston becomes long. In addition, in a case where bearings are arranged on the front and rear sides of the movable element, the distance between the bearings becomes long because of the long movable element, the bearing load increases due to an increase in the moment acting on the movable element, and the service life of the bearings is reduced. In addition, when the movable element is long, the movable element is likely to be deflected by the magnetic attraction force acting on the movable element, which may cause deformation of the movable element, contact with the stator, and breakage of the movable element.

An object of the present invention is to provide a linear motor, a compressor equipped with the linear motor, a refrigerator equipped with the compressor, and a vehicle air suspension equipped with the compressor, which are suitable for a compressor having asymmetric load characteristics in both directions of a stroke, improve the service life of a bearing, and reduce a total length of a system.

Solution to Problem

In order to achieve the above object, the present invention provides a linear motor including a field element including a magnetic pole frame and a plurality of field element poles provided in the magnetic pole frame, and a plurality of armature magnetic poles around which windings are wound and that are provided so as to sandwich the field element, the field element and the armature magnetic poles are relatively displaced, the plurality of field element poles: include primary magnets arranged between the plurality of armature magnetic poles and first secondary magnets arranged externally relative to spaces between the plurality of armature magnetic poles in either direction of the relative displacement, and a neck part of the magnetic pole frame connected to a bearing is provided externally in the other direction of the relative displacement.

Advantageous Effects of Invention

According to the present invention, it is possible to provide a linear motor, a compressor equipped with the linear motor, a refrigerator equipped with the compressor, and a vehicle air suspension equipped with the compressor, which improve the service life of a bearing, and reduce a total length of a system. Problems, configurations, and effects other than those described above will be clarified from the following description of embodiments.

DESCRIPTION OF EMBODIMENTS

Hereinafter, Examples of the present invention will be described with reference to the drawings. In the plurality of Examples and modifications of each Example, the same constituent elements are denoted by the same reference signs, and description thereof is omitted. For the sake of explanation, terms "front-rear direction", "left-right direction", and "top-bottom direction", which are orthogonal to each other, are used, but the gravity direction does not necessarily have to be downward, and can be parallel to the top, right, left, front, or rear direction or other directions.

In each Example and each modification described below, the front-rear direction coincides with a driving direction of a movable element 2, and the top-bottom direction coincides with a direction perpendicular to magnetic pole surfaces (surfaces on which S and N poles are generated) of field element poles 210. The longitudinal direction of the movable element 2 is the front-rear direction.

Example 1

Figure 1:
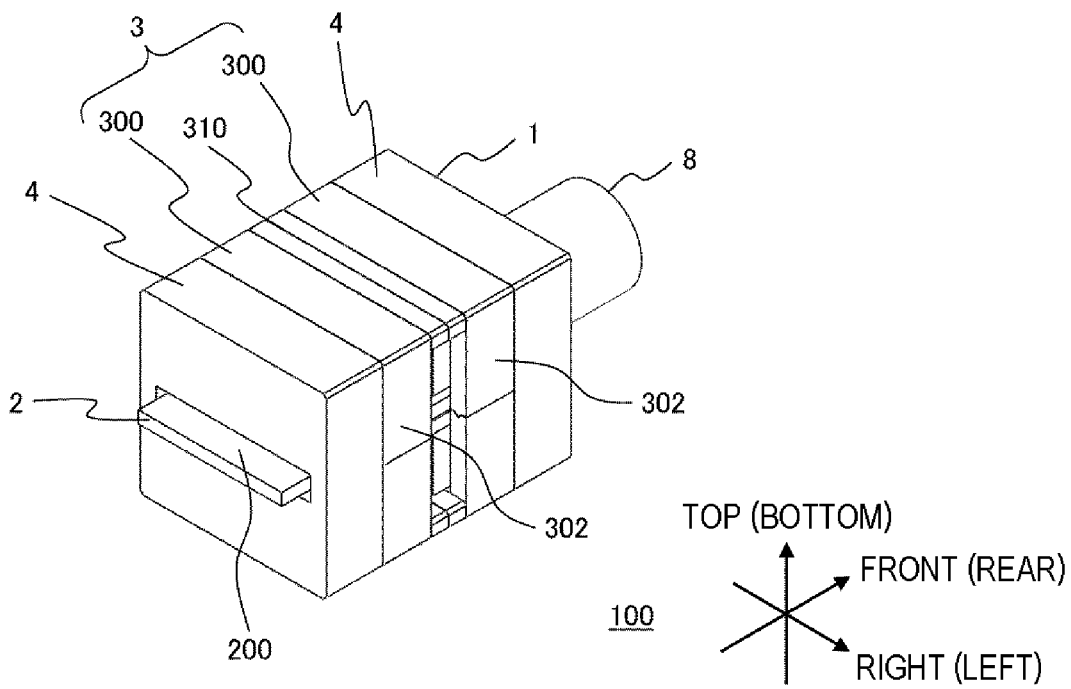
FIG. 1 is a perspective view of a linear motor according to Example 1.
Figure 2:
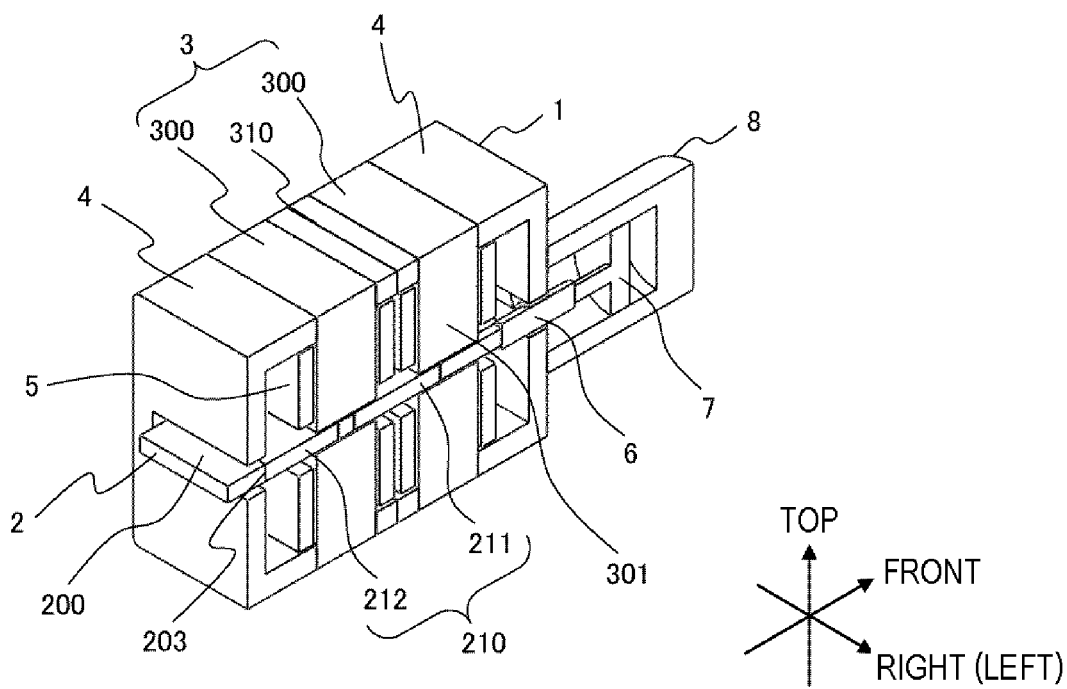
FIG. 2 is a perspective view illustrating a cross section perpendicular to a left-right direction of the linear motor according to Example 1.
Figure 3:
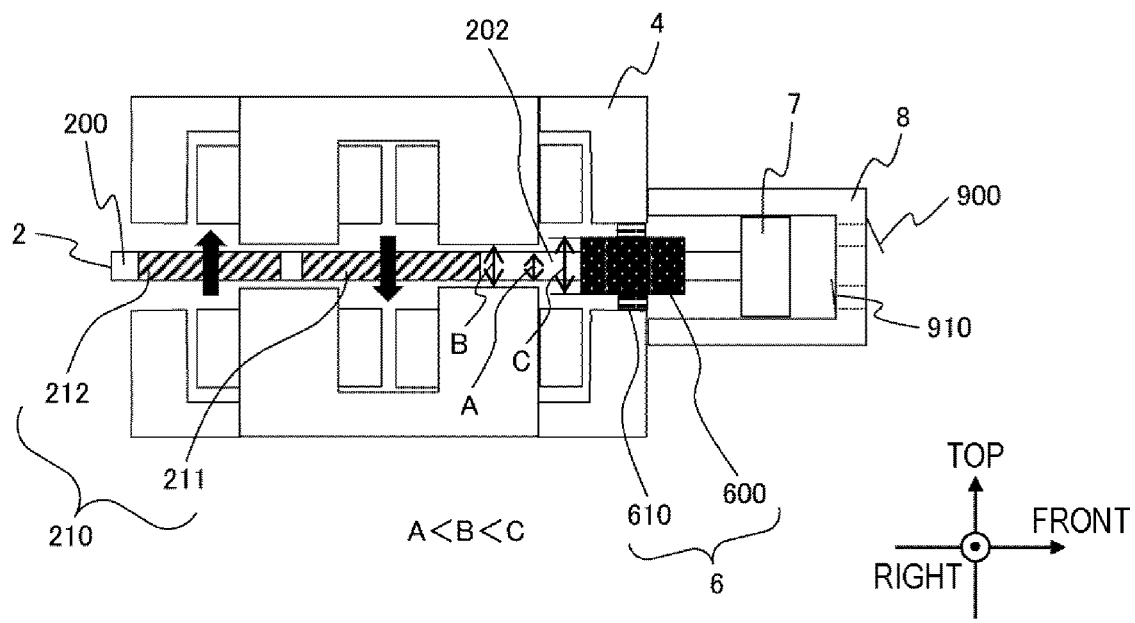
FIG. 3 is a cross-sectional view perpendicular to the left-right direction of the linear motor according to Example 1.
Figure 4:
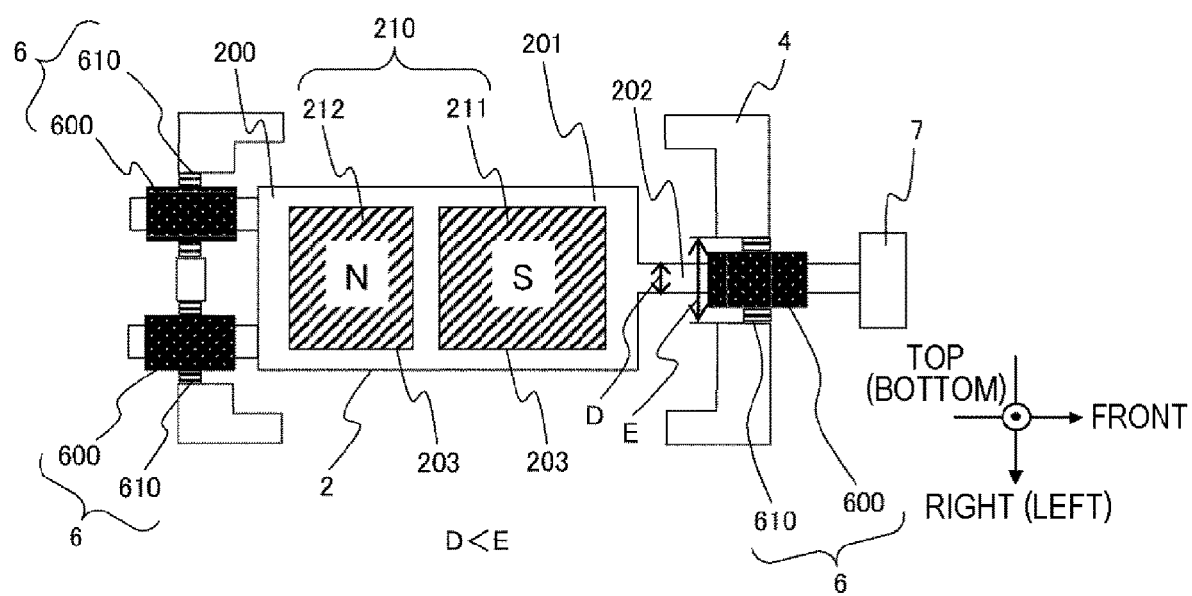
FIG. 4 is a cross-sectional view perpendicular to a top-bottom direction of the linear motor according to Example 1.

A linear motor according to Example 1 of the present invention will be described with reference to FIGS. 1 to 7. FIG. 1 is a perspective view of the linear motor according to Example 1. FIG. 2 is a perspective view illustrating a cross section perpendicular to a left-right direction of the linear motor according to Example 1. FIG. 3 is a cross-sectional view perpendicular to the left-right direction of the linear motor according to Example 1. FIG. 4 is a cross-sectional view perpendicular to a top-bottom direction of the linear motor according to Example 1.

The linear motor 100 includes a stator 1 and a movable element 2. In the following description, a stator that makes an armature side stationary with respect to the ground and a movable element that moves the field element side in the front-rear direction with respect to the ground will be described, but the stator and the movable element may have the opposite relationship. That is, the linear motor 100 is configured such that a field element and an armature are relatively displaced. Bearings 6, a piston 7, and a cylinder 8 are disposed in a front direction of the linear motor 100 to constitute a compressor that compresses air inside the cylinder 8.

<Stator 1>

The stator 1 includes an armature 3, end members 4 disposed on the front side and the rear side of the armature 3, and windings 5. The armature 3 has cores 300 made of a soft magnetic material, and the cores 300 have a plurality of magnetic pole teeth 301 (armature magnetic poles) on the upper and lower sides, and the windings 5 are wound around each of the magnetic pole teeth 301. A bridge 310 is made of a soft magnetic material or a non-magnetic material, and the plurality of cores 300 are connected by the bridge 310. Although the armature 3 of the present Example is configured by arranging the two cores 300 in the front-rear direction, three or more cores 300 may be arranged in the front-rear direction, and the plurality of cores 300 may be connected by the bridge 310. The end members 4 can be provided on the front side of the foremost armature 3 and/or on the rear side of the rearmost armature 3.

<Cores 300>

Each of the cores 300 includes magnetic pole teeth 301 arranged to face each other with the movable element 2 (field element) interposed therebetween, and arm portions 302 connecting the two magnetic pole teeth 301 on the left and right. The magnetic pole teeth 301 and the arm portions 302 can be formed by, for example, stacking electromagnetic steel plates in the front-rear direction. The windings 5 are wound around the magnetic pole teeth 301.

The arm portions 302 are made of a soft magnetic material extending in the top-bottom direction on both outer sides of the windings 5 and the movable element 2 in the left-right direction, and can guide a magnetic flux, which is emitted from the field element poles 210 and enters a magnetic pole tooth 301, to another magnetic pole tooth 301 facing the magnetic pole tooth 301 via the movable element 2. As a result, the cores 300 can form a magnetic path including the magnetic pole tooth 301, the plurality of field element poles 210 including primary magnets 211 and secondary magnets 212 (first secondary magnets) facing the magnetic pole tooth 301, the magnetic pole tooth 301 facing the field element poles 210 on the surface opposite to the side where the above-described magnetic pole tooth 301 faces, and the arm portions 302.

A magnetic flux passing through the magnetic path is referred to as a transverse magnetic flux.

<Bridge 310>

The bridge 310 can be formed of a soft magnetic material or a non-magnetic material. When the bridge 310 is made of a soft magnetic material, a magnetic circuit that allows a magnetic flux flowing through the adjacent cores 300 to pass therethrough can be used. The bridge 310 can be formed by stacking punched electromagnetic steel sheets in the front-rear direction, for example. For this reason, the armature 3 in which the bridge 310 is disposed between the two cores 300 can form a magnetic path including the two adjacent cores 300 and the field element poles 210 according to the design such as an interval between the field element poles 210 in the front-rear direction. A magnetic flux passing through the magnetic path is referred to as a longitudinal magnetic flux.

<End Members 4>

The end members 4 can be formed of a soft magnetic material or a non-magnetic material. The end members 4 are fixed together with the cores 300 and the bridge 310 by a fixing member such as a through bolt (not illustrated) extending in the front-rear direction. Support members such as the bearings 6 are disposed on the end members 4 to support the movable element 2.

<Movable Element 2>

The longitudinal direction of the movable element 2 (field element) is the front-rear direction. The movable element 2 includes a magnetic pole frame 200 made of a non-magnetic material or a soft magnetic material for fixing a plurality of permanent magnets in the front-rear direction, and the field element poles 210 provided in the magnetic pole frame 200. The movable element 2 of the present Example includes the two field element poles 210 fixed, and includes the primary magnets 211 between the cores 300 arranged in the front-rear direction and the secondary magnets 212 arranged on the rear side of the primary magnets. The primary magnets 211 are arranged between the plurality of magnetic pole teeth 301, and the secondary magnets 212 are arranged externally relative to the plurality of magnetic pole teeth 301 in either direction in the front-rear direction (direction of relative displacement). When three or more cores 300 are arranged in the front-rear direction, the number of primary magnets 211 between the cores 300 arranged in the front-rear direction can also be increased, but one secondary magnet 212 is arranged at the rearmost part. Each of the field element poles 210 is magnetized in the top-bottom direction, and the upper surfaces of the adjacent field element poles 210 are arranged such that N poles and S poles are alternately arranged.

One bearing 6 is disposed at the front end of the movable element 2, and the piston 7 is further disposed on the front side of the bearing 6. Two bearings 6 are disposed at the rear end of the movable element 2, and can be displaced relative to the stator 1. Each of the bearings 6 includes a bearing shaft 600 connected to the movable element 2 and movable in the front-rear direction together with the movable element 2, and a bearing bush 610 connected to the end members 4 and in contact with an outer peripheral side of the bearing shaft 600.

The movable element 2 is disposed in a space between the two magnetic pole teeth 301 in the top-bottom direction and between the two arm portions 302 in the left-right direction. The field element poles 210 can have a flat plate shape perpendicular to the top-bottom direction. That is, in the present Example, the field element poles 210 have a flat plate shape in which the width dimension in the left-right direction and the length dimension in the front-rear direction are larger than the thickness dimension in the top-bottom direction. In the present Example, the top-bottom direction is a direction in which the magnetic pole teeth 301 face the field element poles 210.

Note that, as described above, in the present Example, the movable element 2 includes a field element.

<Magnetic Pole Frame 200>

As illustrated in FIGS. 3 and 4, the magnetic pole frame 200 includes a barrel part 201 into which the field element poles 210 are fitted, and a neck part 202 connected to the bearing 6 on the front side. The neck part 202 is arranged externally in the other direction in the front-rear direction (direction of the relative displacement) of the magnetic pole frame 200.

The barrel part 201 is formed in a ladder-like shape including a plurality of gaps 203 into which the field element poles 210 are fitted. The field element poles 210 are fixed to the magnetic pole frame 200 without falling out of the magnetic pole frame 200 in the left-right direction and the front-rear direction by being fitted into the gaps 203. The magnetic pole frame 200 has edges of the gaps 203 surrounding the field element poles, and supports the field element poles 210. The gaps 203 are formed as through holes penetrating the magnetic pole frame 200 in the top-bottom direction, and constitute fitting portions into which the field element poles 210 are fitted in the top-bottom direction. The field element poles 210 are disposed in the gaps (fitting portions) 203 so as to fill the gaps (fitting portions) 203, thereby preventing positional displacement in the left-right direction and the front-rear direction. Further, an adhesive is applied to a contact surface between the field element poles 210 and the gaps (fitting portions) 203, thereby preventing positional displacement in the top-bottom direction.

A thickness A of the neck part 202 in the top-bottom direction is set to be smaller than a distance B between the magnetic pole teeth 301 in the top-bottom direction, for example. As a result, the bearing shafts 600 larger than the distance B between the magnetic pole teeth 301 in the top-bottom direction can be brought close to the vicinity of the magnetic pole teeth 301, and the stroke of the movable element 2 toward the rear direction can be increased.

A lateral width D of the neck part 202 is, for example, smaller than a width E of each of holes of the end members 4 in which the bearing bushes are housed. As a result, the neck part 202 can be inserted into the hole of the end member 4, and the stroke of the movable element 2 toward the front direction can be increased.

The length of the neck part 202 is preferably set to such a degree that the bearing shafts 600 do not come into contact with the magnetic pole teeth 301 when the movable element 2 is located at the rearmost portion, and to such a degree that the barrel part 201 of the movable element 2 does not come into contact with the end member 4 when the movable element 2 is located at the foremost portion. Accordingly, the stroke of the movable element 2 can be increased.

The magnetic pole frame 200 may be formed of a soft magnetic material or a non-magnetic material. The gaps (fitting portions) 203 may be formed of recess portions to which the field element poles 210 can be attached. The recess portions are formed in a recess shape on one end surface of the magnetic pole frame 200 in the top-bottom direction. The recess portions can also be regarded as a kind of the gaps (fitting portions) 203 into which the field element poles 210 are fitted.

<Field Element Poles 210>

Each of the field element poles 210 may be a rare earth magnet such as a neodymium magnet, or a permanent magnet made of another material such as a ferrite magnet. In addition, some of the field element poles 210 may be made of a soft magnetic material.

<Comparison of Thrust Characteristics of Linear Motor>

Figure 5:
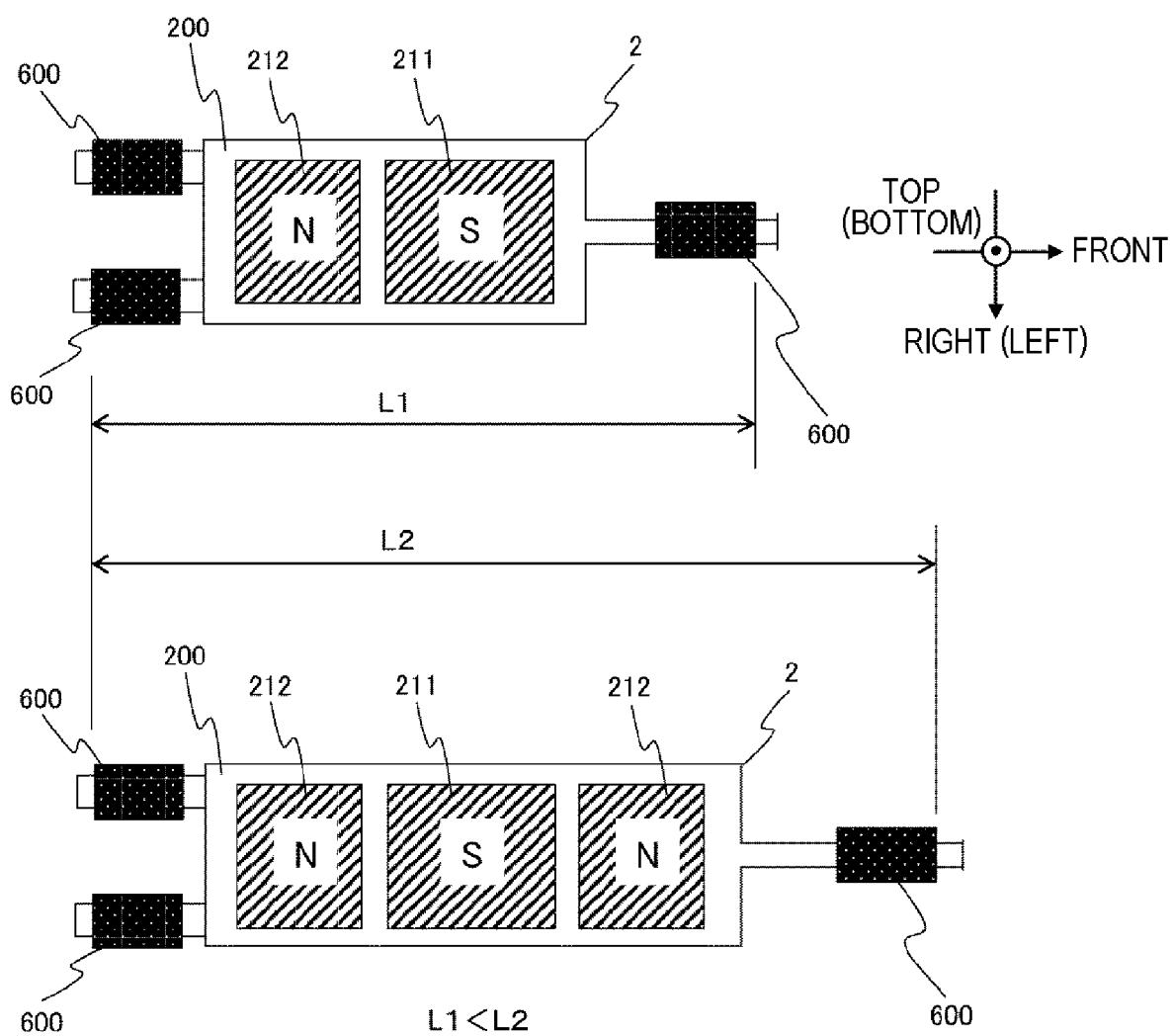
FIG. 5 is a cross-sectional view perpendicular to a top-bottom direction of a movable element according to Example 1 and a movable element according to Comparative Example.
Figure 6:
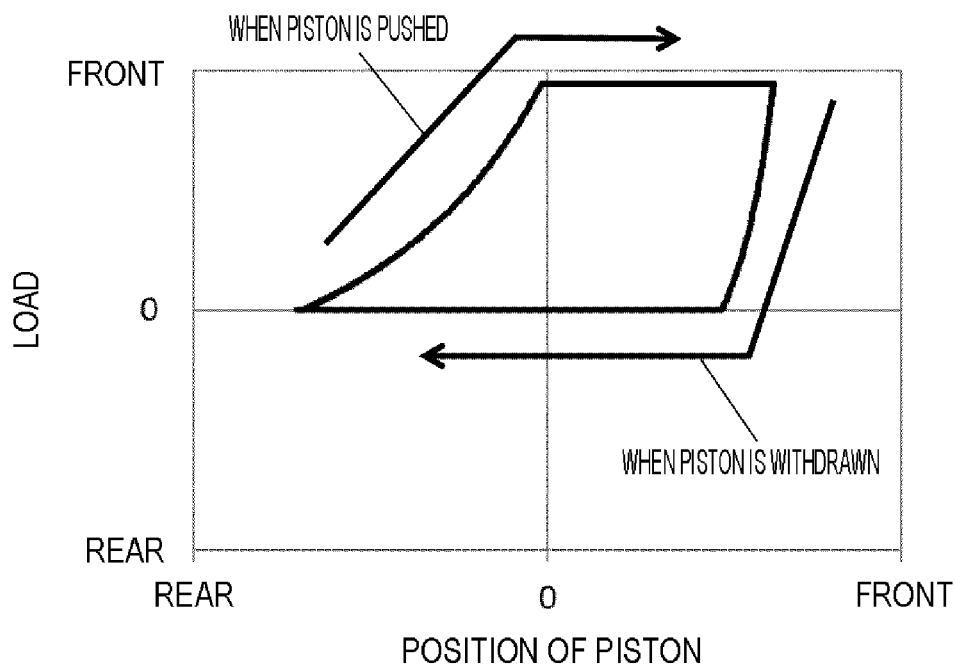
FIG. 6 is a diagram illustrating load characteristics applied to a piston with respect to the position of the piston of a compressor.
Figure 7:
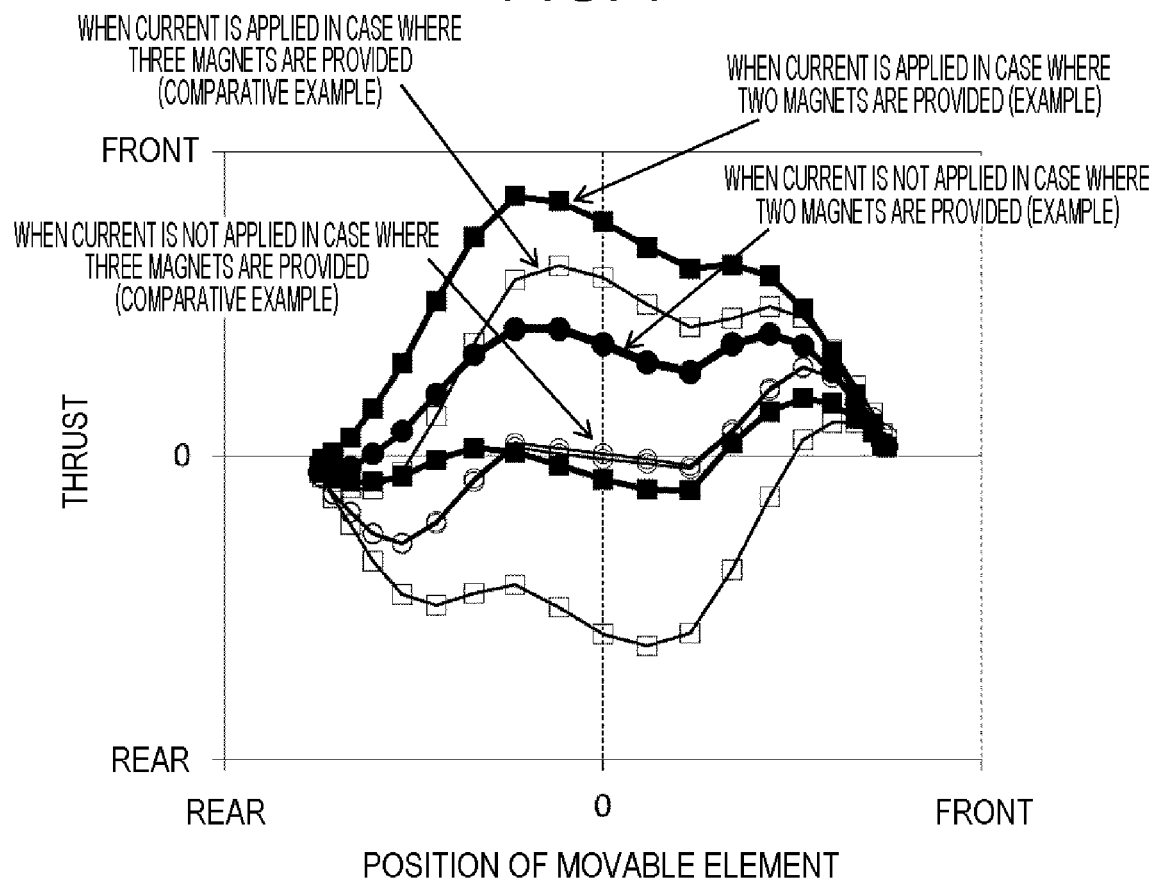
FIG. 7 is a diagram illustrating results of comparison of thrust generated in the movable element 2 when an alternating current is applied to windings 5 and when an alternating current is not applied to the windings 5 with respect to the position of the movable element in Example 1 and Comparative Example.

FIG. 5 is a cross-sectional view perpendicular to the top-bottom direction of the movable element according to Example 1 and a movable element according to Comparative Example. FIG. 6 is a diagram illustrating load characteristics applied to the piston with respect to the position of the piston of the compressor. FIG. 7 is a diagram illustrating results of comparison of thrust generated in the movable element 2 when an alternating current is applied to the windings 5 and when an alternating current is not applied to the windings 5 with respect to the position of the movable element in Example 1 and Comparative Example.

In FIG. 5, the movable element 2 according to Example 1 includes one primary magnet 211 and one secondary magnet 212, and a distance (length) between the bearing shafts 600 in the front-rear direction (relative displacement direction) is L1. On the other hand, in the movable element 2 according to Comparative Example, one primary magnet 211 and two secondary magnets 212 are provided, and a distance (length) between bearing shafts 600 in a front-rear direction (relative displacement direction) is defined as L2. As can be seen from FIG. 5, L1<L2, and in the present Example, the distance (length) between the bearing shafts 600 in the front-rear direction can be shortened, the moment force applied to the movable element 2 can be reduced, and the load applied to each of the bearings can be reduced. As a result, the service life of the bearings can be improved.

As can be seen from FIG. 6, at the time of pushing of the piston, the load increases as the pressure inside the cylinder increases, and when the pressure reaches a desired pressure and a discharge valve 900 is opened, the load becomes constant. On the other hand, at the time of withdrawal of the piston, the load decreases as the pressure inside the cylinder decreases, and when the pressure inside the cylinder matches the pressure on the suction side, a suction valve 910 is opened and the load becomes 0. As described above, the load applied to the piston of the compressor is mainly in a direction in which the piston is pushed, and is asymmetric with respect to the front-rear direction.

As can be seen from FIG. 7, in a case where three magnets according to Comparative Example are provided, since field element poles 210 are arranged symmetrically in the front-rear direction, a thrust average value when a current is not applied is 0, and the magnitude of the thrust when a current is applied is symmetrical in the front-rear direction. Therefore, in order to cope with the above-described asymmetric load in the front-rear direction, it is necessary to reduce the thrust at the time of withdrawal of the piston, and special control or a circuit for applying a current asymmetric in both directions of a stroke has been required.

On the other hand, in a case where the two magnets according to the present Example are provided, since the field element poles 210 are arranged asymmetrically in the front-rear direction, a thrust average value when a current is not applied is positive in the front direction, and the magnitude of the thrust when a current is applied is asymmetrical in the front-rear direction. Therefore, special control or a specific circuit is unnecessary in order to cope with the load asymmetric in the front-rear direction described above, and a current symmetric in both directions of a stroke can be passed.

According to the present Example, the service life of the bearings can be improved, and the overall length of the system can be reduced.

Example 2

Figure 8:
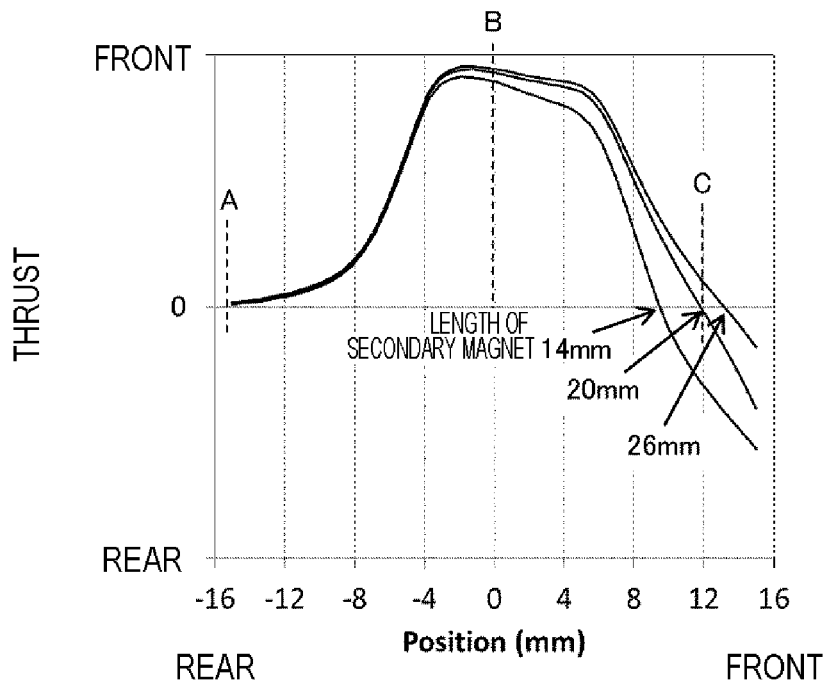
FIG. 8 is a diagram illustrating a waveform of thrust when a direct current is applied to windings to move a movable element in a front-rear direction (relative displacement direction) when a length of a secondary magnet is changed in Example 2.

A linear motor according to Example 2 of the present invention will be described with reference to FIGS. 8 to 11. FIG. 8 is a diagram illustrating a waveform of thrust when a direct current is applied to windings to move a movable element in a front-rear direction (relative displacement direction) when a length of a secondary magnet is changed in Example 2. In FIG. 8, the length of the secondary magnet in the front-rear direction is changed to 14 mm, 20 mm, and 26 mm. As illustrated in FIG. 8, a zero-cross point at which the thrust crosses a zero-level axis in the front direction differs depending on the length of the secondary magnet in the front-rear direction, and the longer the length, the longer the zero-cross point extends in the front direction. When the thrust exceeds the zero-cross point, the thrust acts in the rear direction, and thus the stroke in the front direction can be limited by the zero-cross point.

Figure 9:
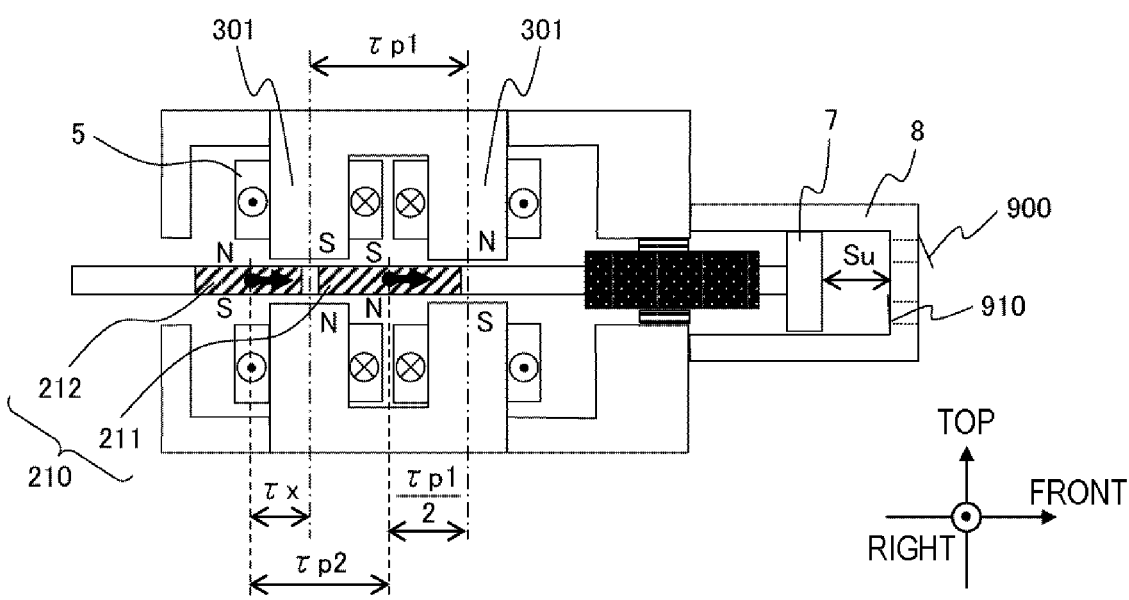
FIG. 9 is a schematic diagram of thrust generated in each movable element magnetic pole when a current is applied to the windings and the movable element is located at the center in a front-rear direction in Example 2.
Figure 10:
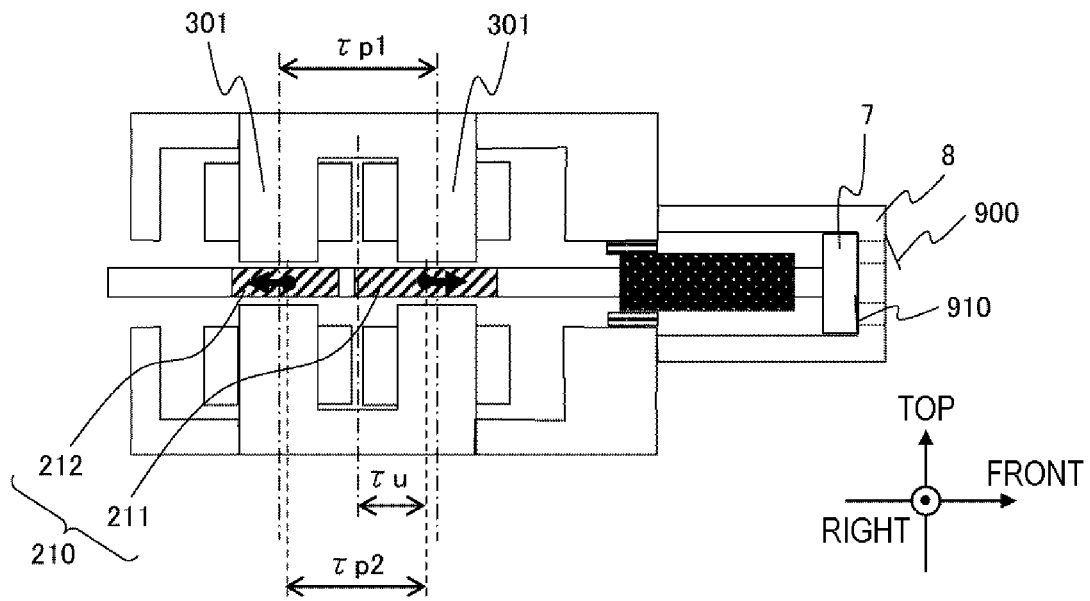
FIG. 10 is a schematic diagram of thrust generated in each movable element magnetic pole when the movable element is located at the foremost portion in the front-rear direction in Example 2.
Figure 11:
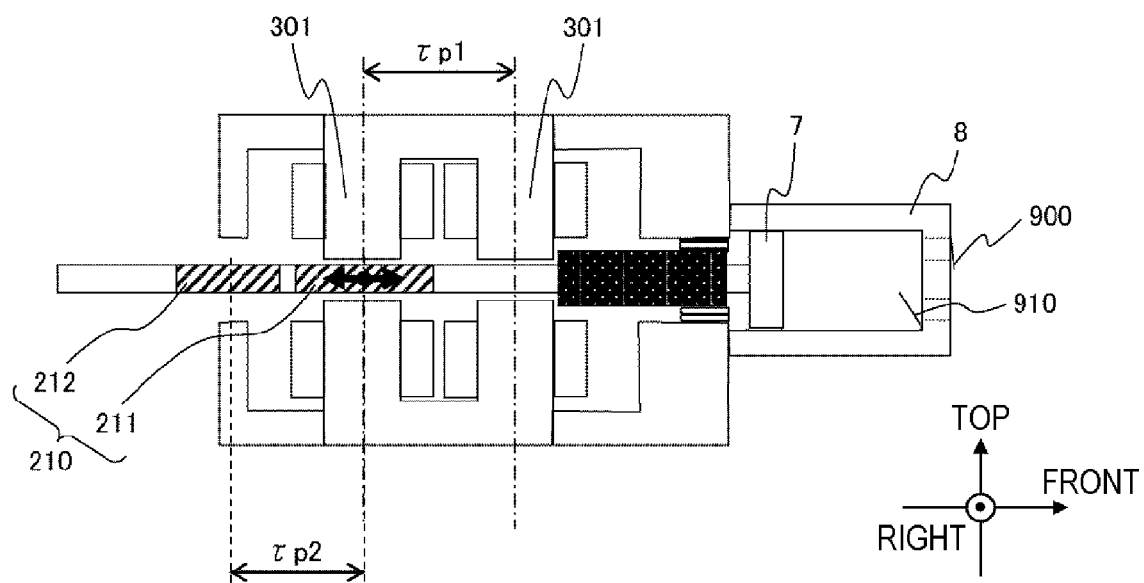
FIG. 11 is a schematic diagram of thrust generated in each movable element magnetic pole when the movable element is located at the rearmost portion in the front-rear direction in Example 2.

The above description will be explained with reference to FIGS. 9 to 11. FIG. 9 is a schematic diagram of thrust generated in each movable element magnetic pole when a current is applied to the windings and the movable element is located at the center in the front-rear direction in Example 2, and corresponds to a position B in FIG. 8. FIG. 10 is a schematic diagram of thrust generated in each movable element magnetic pole when the movable element is located at the foremost portion in the front-rear direction in Example 2, and corresponds to a position C in FIG. 8. FIG. 11 is a schematic diagram of thrust generated in each movable element magnetic pole when the movable element is located at the rearmost portion in the front-rear direction in Example 2, and corresponds to a position A in FIG. 8.

In FIG. 9, a pitch between poles of magnetic pole teeth 301 in the front-rear direction is $\tau p1$, a pitch between poles of field element poles 210 in the front-rear direction is $\tau p2$, the distance from the center of the magnetic pole tooth 301 on the front side to the center of a primary magnet 211 is $\tau p1/2$, the distance from the center of the magnetic pole tooth 301 on the rear side to the center of the secondary magnet 212 is $\tau x$, and the distance from an end of a piston 7 to an inner wall of a cylinder is Su. In this case, when a current is applied to the windings, as illustrated in the drawing, an N pole and an S pole are excited at ends of each of the magnetic pole teeth 301, and the thrust in the front direction indicated by arrows is generated in each magnet by the interaction between the magnetic poles by the primary magnet 211 and the secondary magnet 212.

FIG. 10 illustrates a position to which the movable element is advanced by $\tau u$ in the front direction, and that corresponds to the position C in FIG. 8. The center of the primary magnet 211 and the center of the secondary magnet 212 are located between the centers of the two magnetic pole teeth 301, and the thrust generated in each magnet is offset in opposite directions, so that the thrust becomes 0. The position of the movable element at this time is expressed by the following equation.

$$\tau u = (\tau p1/2 + \tau x)/2 \qquad (1)$$

In the compressor, when a position where the piston collides with a wall surface of the cylinder, that is, a stroke upper limit position is Su, u is set to be larger than a thrust generation upper limit position τu, so that the effect of avoiding the collision of the piston and preventing the damage of the piston can be obtained. That is, the following may be used.

$$Su > (\tau p1/2 + \tau x)/2 \quad \ldots \quad (2)$$ Solving this for τx gives:

$$\tau x < 2Su - \tau p1/2 \quad (3)$$

The length of each secondary magnet 212 with respect to a desired stroke can be determined by the above equation. Here, $$\tau p2 = \tau p1/2 + \tau x \quad (4)$$

The following relationship is derived from Equations (3) and (4).

$$\tau p2 < 2Su \quad (5)$$

That is, the pitch τp2 between poles of the field element poles 210 in the front-rear direction may be less than twice the stroke upper limit position Su.

FIG. 11 illustrates a state where the movable element is located at the rearmost portion in the front-rear direction, and corresponds to the position A in FIG. 8. Since the secondary magnet 212 extends outside the magnetic pole tooth 301, the thrust is affected only by the primary magnet 211 and does not depend on the length of the secondary magnet 212.

According to the present Example, it is possible to suppress the effect of the secondary magnet on the thrust when the movable element is located at the rearmost portion in the front-rear direction.

Example 3

Figure 12:
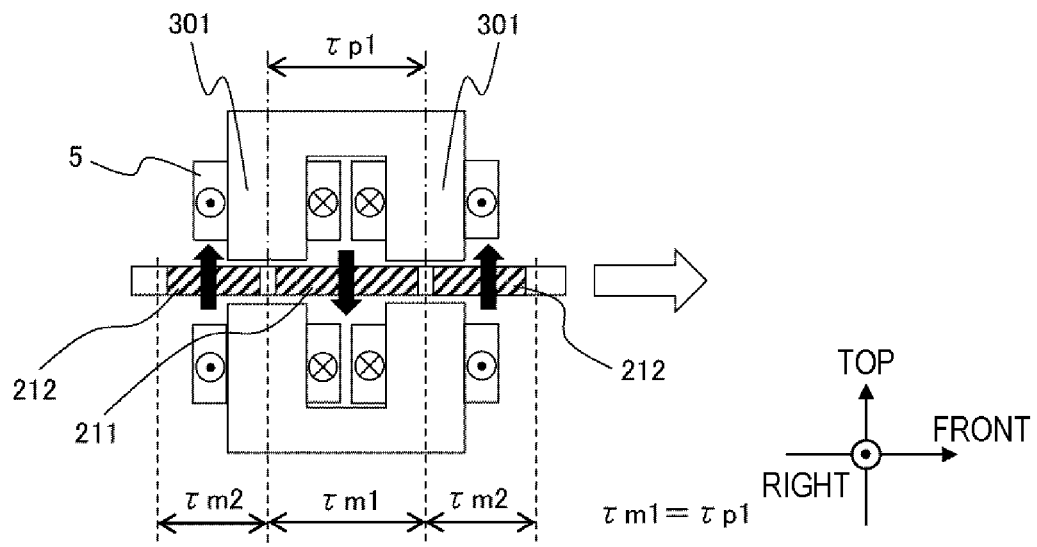
FIG. 12 is a schematic diagram of thrust generated in a movable element when a current is applied to windings and the movable element is located at the center in a front-rear direction in a case where three magnets according to Conventional Example are provided.
Figure 13:
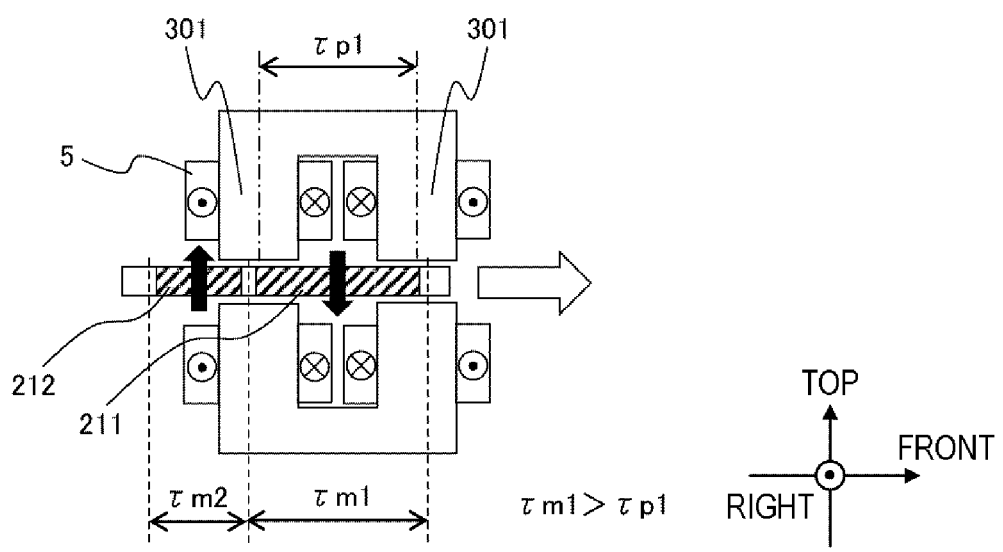
FIG. 13 is a schematic diagram of thrust generated in a movable element when a current is applied to windings and the movable element is located at the center in a front-rear direction in Example 3.
Figure 14:
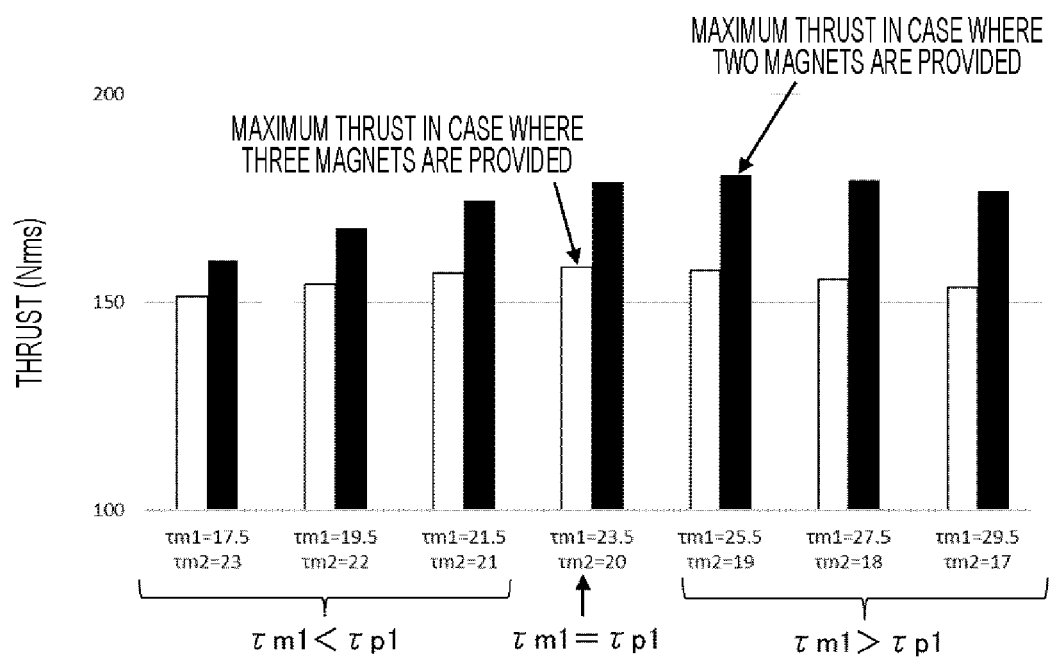
FIG. 14 is a graph illustrating the transition of the magnitude of thrust generated with respect to the ratio of lengths of a primary magnet and a secondary magnet in Example 3 and Conventional Example.

A linear motor according to Example 3 of the present invention will be described with reference to FIGS. 12 to 14. FIG. 12 is a schematic diagram of thrust generated in a movable element when a current is applied to windings and the movable element is located at the center in a front-rear direction in a case where three magnets according to Conventional Example are provided. FIG. 13 is a schematic diagram of thrust generated in a movable element when a current is applied to windings and the movable element is located at the center in a front-rear direction in Example 3. FIG. 14 is a graph illustrating the transition of the magnitude of thrust generated with respect to the ratio of lengths of a primary magnet and a secondary magnet in Example 3 and Conventional Example.

In FIGS. 12 and 13, a pitch between poles of magnetic pole teeth 301 in the front-rear direction is τp1, a pitch between poles of the primary magnet 211 is τm1, and a pitch between poles of the secondary magnet is τm2. Here, τp1=23.5. FIG. 14 illustrates the transition of the magnitude of the thrust when the ratio of the lengths τm1 and τm2 is changed.

In a case where three magnets according to Comparative Example are provided, the thrust becomes maximum when τm1=23.5 and τm2=20, and there is a relationship of τm1=τp1 in this case. On the other hand, in a case where the two magnets according to the present Example are provided, the thrust is maximized when τm1=25.5 and τm2=19, and in this case, the pitch τm1 between the poles of the primary magnet 211 is longer than the pitch τp1 between poles of a plurality of armature magnetic poles (τm1>τp1). Therefore, the thrust can be maximized by setting τm1=τp1 in a case where three magnets according to Comparative Example are provided, whereas the thrust can be maximized by setting τm1>τp1 in a case where the two magnets according to the present Example are provided.

According to the present Example, the thrust in the front direction can be increased, and the length of the linear motor in the front-rear direction can be shortened.

Example 4

Figure 15:
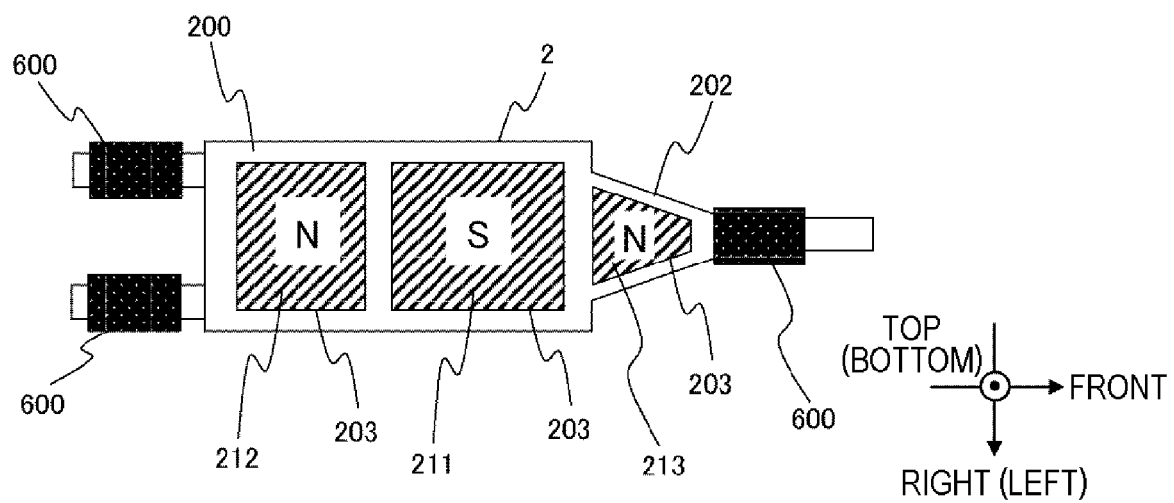
FIG. 15 is a cross-sectional view perpendicular to a top-bottom direction of a movable element according to Example 4.
Figure 16:
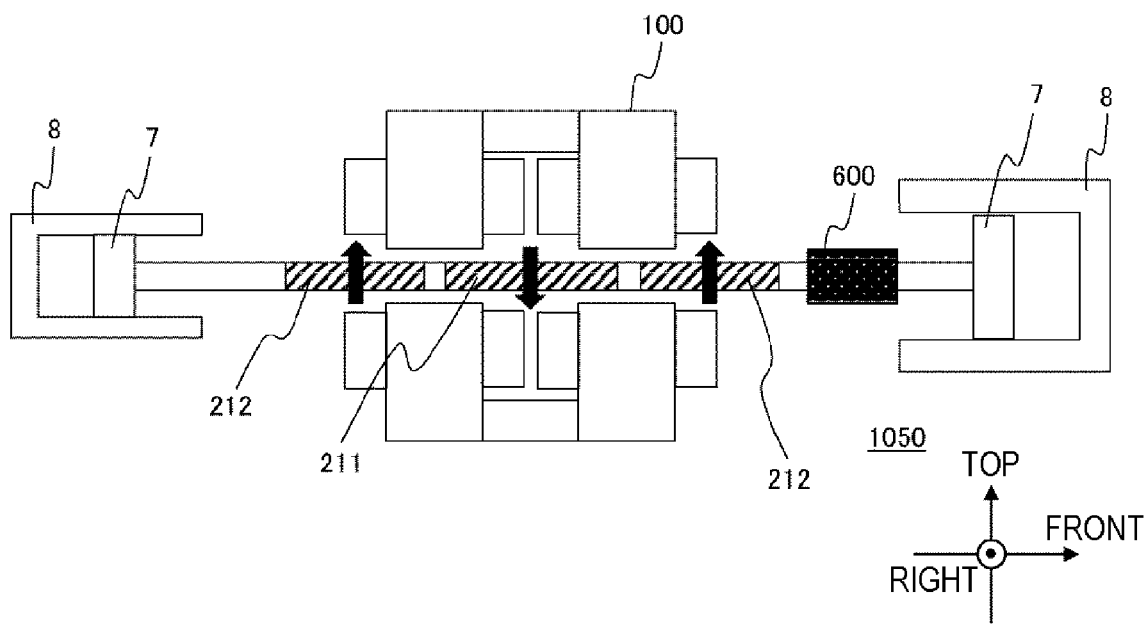
FIG. 16 is a cross-sectional view perpendicular to a left-right direction of a linear motor according to Example 4.

A linear motor according to Example 4 of the present invention will be described with reference to FIGS. 15 to 16. FIG. 15 is a cross-sectional view perpendicular to a top-bottom direction of a movable element according to Example 4. FIG. 16 is a cross-sectional view perpendicular to a left-right direction of the linear motor according to Example 4.

A configuration according to Example 4 is the same as that in Example 1 except for the following points, and the configuration described in Example 1 can be used except for the following configuration according to the present Example.

A neck part 202 of the movable element 2 according to the present Example includes a gap 203 to which a second secondary magnet 213 having a length in the left-right direction shorter than those of a primary magnet 211 and a secondary magnet 212 is fitted. The second secondary magnet 213 is disposed in the gap (fitting portion) 203 so as to fill the gap (fitting portion) 203, thereby preventing positional displacement in the left-right direction and the front-rear direction. Further, an adhesive is applied to a contact surface between the secondary magnet 212 and the gap (fitting portion) 203, thereby preventing positional displacement in the top-bottom direction. The secondary magnet 212 and the second secondary magnet 213 are provided asymmetrically with respect to the position of the center of the primary magnet 211 in the front-rear direction (relative displacement direction).

The second secondary magnet 213 can improve the thrust when the movable element 2 is driven in the rear direction, and can be applied to a case where a load is also applied in the rear direction. For example, as illustrated in FIG. 16, by arranging pistons 7 and cylinders 8 on both sides of the movable element 2 in the front-rear direction, the pistons 7 and the cylinders 8 can be used as a so-called two-stage compressor in which one of the cylinders compresses to an intermediate pressure and the other of the cylinders compresses to the highest pressure.

The diameters of the piston 7 and the cylinder 8 disposed in the rear direction are smaller than the diameters of the piston 7 and the cylinder 8 disposed in the front direction.

Example 5

Figure 17:
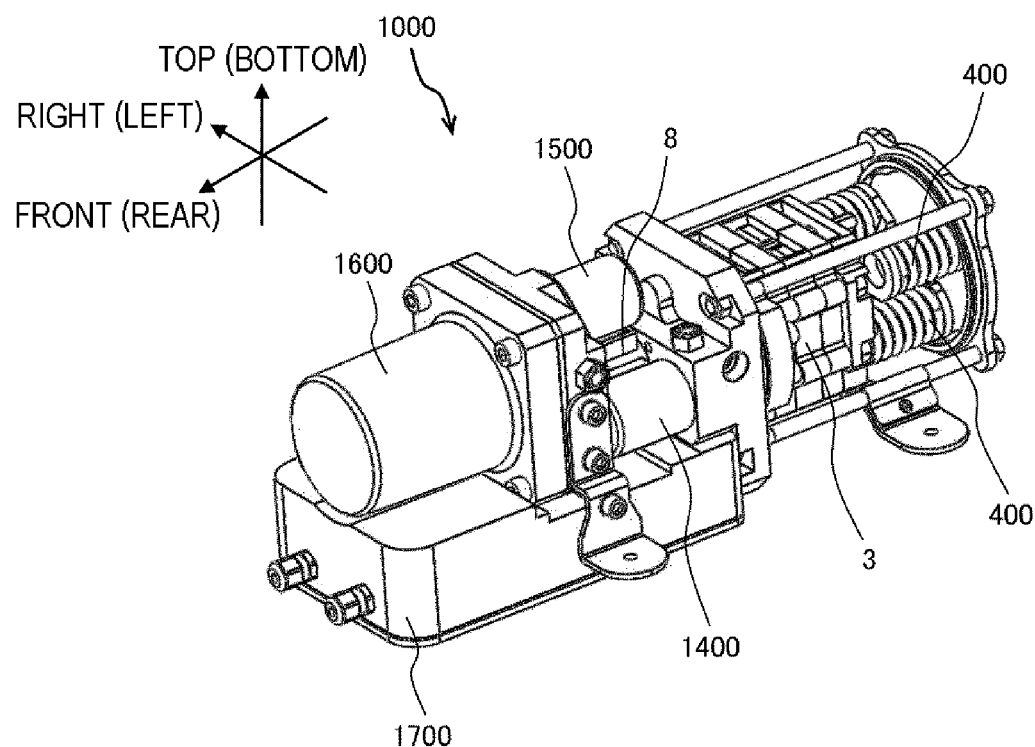
FIG. 17 is a perspective view illustrating a compressor using a linear motor according to Example 5 of the present invention.
Figure 18:
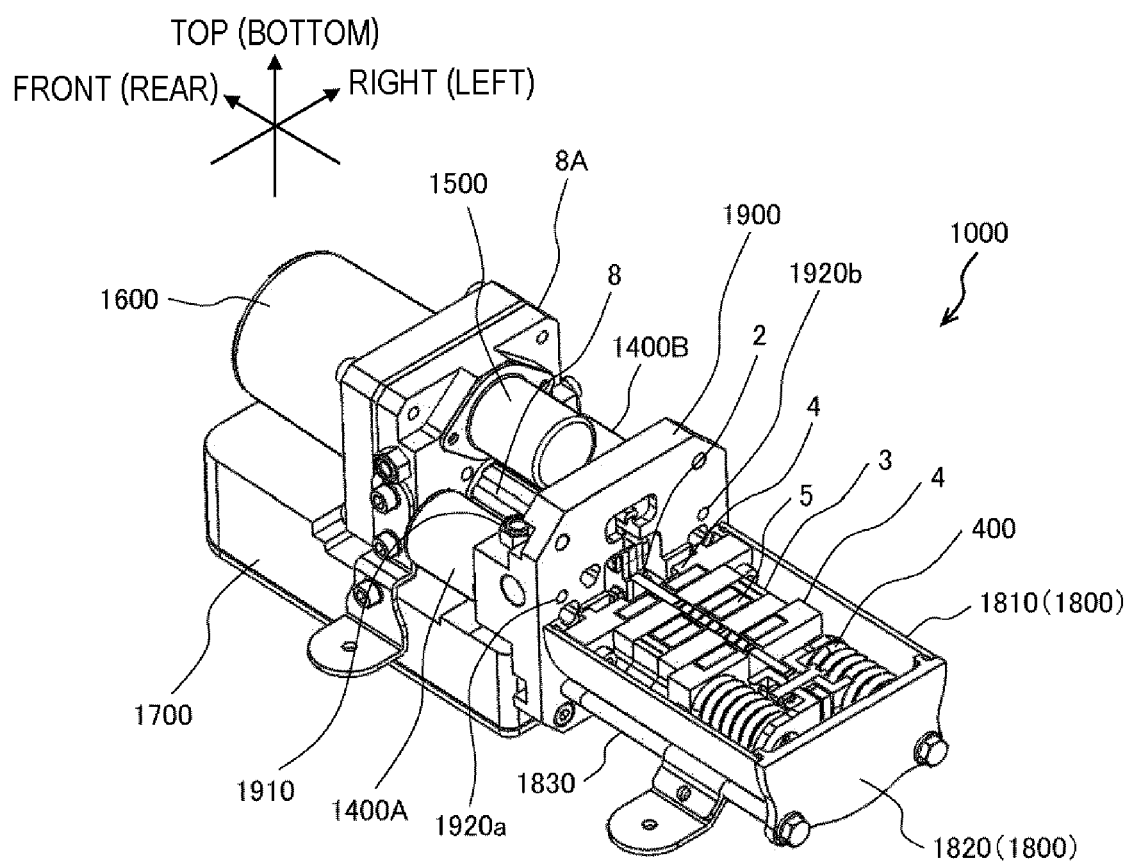
FIG. 18 is a cross-sectional view illustrating a main part of the compressor in FIG. 17.

FIG. 17 is a perspective view illustrating a compressor using a linear motor according to Example 5 of the present invention. FIG. 18 is a cross-sectional view illustrating a main part of the compressor in FIG. 17.

The compressor 1000 according to the present Example can be used as a gas compressor that compresses air or a refrigerant, and includes a resonant spring 400 provided on one side of an armature 3 in a reciprocating direction of a movable element 2 and a piston (disposed in a cylinder 8, not shown) provided on the other side of the armature 3, the cylinder 8, electromagnetic valves 1400 (1400A, 1400B), an exhaust valve 1500, a dryer 1600, and an inverter 1700.

In the compressor 1000 according to the present Example, a drive motor for the piston is constituted by the linear motor, and the movable element 2 has a flat plate shape (flat plate shape). The movable element 2 further protrudes rearward from a rear end of an end member 4. As the linear motor, any one of the linear motors according to Examples 1 to 4 is used.

A casing 1800 that houses the armature 3 and the resonant spring 400 is attached to the cylinder 8. In the present embodiment, the end member 4 is used as a front surface of the casing 1800, but a member constituting the front surface of the casing 1800 may be provided on the front side of the end member 4. That is, instead of using the end member 4 as the front surface member of the casing 1800, a front surface member may be provided separately from the end member 4.

In the casing 1800, a cylindrical side surface (side surface member) 1810 and a rear surface (rear surface member, bottom surface member) 1820 are configured separately, and the rear surface 1820 is fixed to the cylinder 8 via a base plate 1900 by an insertion member 1830 extending in the front-rear direction. As a result, the side surface 1810 is sandwiched between the rear surface 1820 and the cylinder 8.

An electrode protrudes forward from the casing 1800 side, and each of extended ends of the windings 5 is electrically connected to one end of the electrode. The other end of the electrode is inserted into the inverter 1700 through a through hole (not illustrated) formed in the base plate 1900, and is electrically connected to an internal inverter circuit.

The base plate 1900 is provided with a gas suction/discharge port 1910. The two electromagnetic valves 1400A and 1400B are attached to the base plate 1900, and two through-holes (gas passages) 1920a and 1920b through which gas flows are provided corresponding to the electromagnetic valves 1400A and 1400B. The electromagnetic valves 1400A and 1400B are three-way valves and constitute a gas suction/discharge valve. When the one electromagnetic valve 1400A is in the suction state, the other electromagnetic valve 1400B is in the discharge state. The one electromagnetic valve causes 1400A gas sucked from the suction/discharge port 1910 in the suction state to flow into the casing 1800 through the through hole 1920a. At this time, the other electromagnetic valve 1400B is in the discharge state, and blocks the flow of the gas through the through hole 1920b.

The gas flowing into the casing 1800 through the electromagnetic valve 1400A flows through a gap between the movable element 2, and the end member 4 and the base plate 1900, flows into the cylinder 8, and flows to the dryer 1600 through the cylinder 8. Furthermore, the gas is discharged from the dryer 1600 through the other electromagnetic valve 1400B. When the suction and discharge states of the electromagnetic valve 1400A and the electromagnetic valve 1400B are switched, the gas flows following the reverse of the above-described path. The cylinder 8 compresses the entered gas as necessary. A suction/discharge port (not illustrated) is provided at a position corresponding to the suction/discharge port 1910 on the side where the through hole 1920b of the base plate 1900 is provided.

The dryer 1600 is attached to a cylinder head 8A of the cylinder 8 so as to be communicable with the inside of the cylinder 8.

According to the present Example, it is possible to provide a compressor capable of increasing the thrust in the front direction and reducing the length of the linear motor in the front-rear direction to suppress an increase in size.

Example 6

Figure 19:
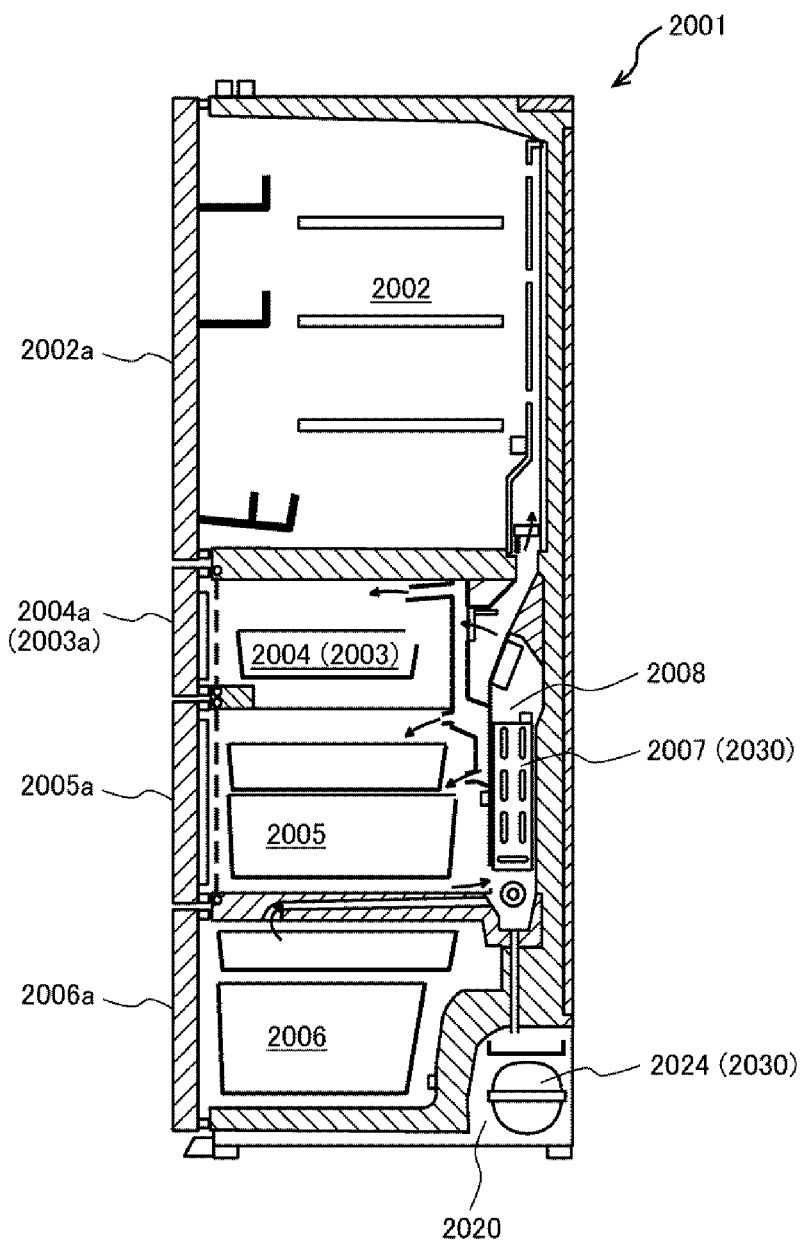
FIG. 19 is a configuration diagram of refrigerator according to Example 6.

FIG. 19 is a configuration diagram of a refrigerator according to Example 6. The refrigerator 2001 includes a double refrigerating compartment door 2002a divided into left and right parts on a front surface side of a refrigerating compartment 2002, and includes a drawer-type ice-making compartment door 2003a, an upper freezing compartment door 2004a, a lower freezing compartment door 2005a, and a vegetable compartment door 2006a on front surfaces of an ice-making compartment 2003, an upper freezing compartment 2004, a lower freezing compartment 2005, and a vegetable compartment 2006, respectively.

A machine compartment 2020 is provided on a rear side of the vegetable compartment 2006, and a compressor 2024 is disposed in the machine compartment 2020. An evaporator compartment 2008 is provided on a rear side of the ice-making compartment 2003, the upper freezing compartment 2004, and the lower freezing compartment 2005, and an evaporator 2007 is provided in the evaporator compartment 2008. In the refrigerator 2001, in addition to the compressor 2024 and the evaporator 2007, a radiator (not illustrated), a capillary tube serving as a decompressor, a three-way valve, and the like are connected by a refrigerant pipe to form a refrigeration cycle 2030.

In the present Example, the linear motor 100 according to any one of the above-described Examples is used for the compressor 2024 constituting the refrigeration cycle 2030 of the refrigerator 2001. For example, the compressor 1000 according to Example 5 may be used as the compressor 2024. As a result, it is possible to suppress an increase in size of the compressor 2024 constituting the refrigeration cycle 2030. A large space can be secured for the refrigerating compartment and the freezing compartment, and a large-capacity refrigerator can be provided without increasing the outer dimensions.

Example 7

Figure 20:
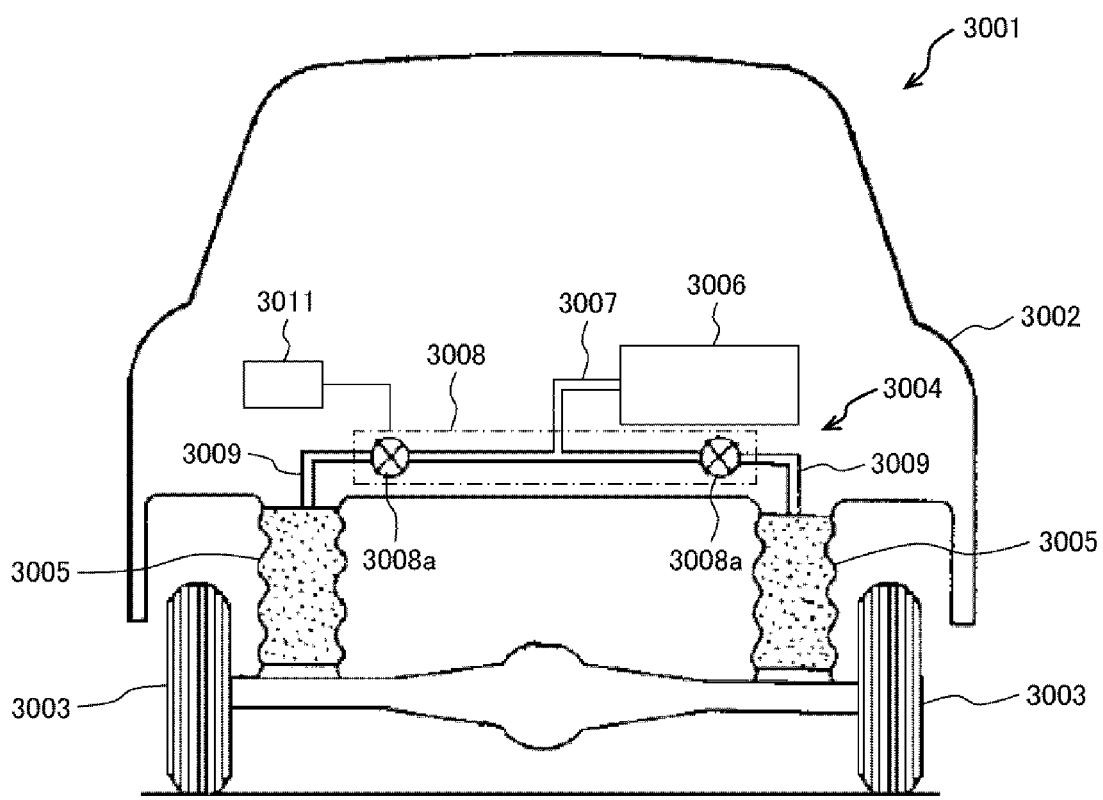
FIG. 20 is a configuration diagram of a vehicle air suspension according to Example 7.

FIG. 20 is a configuration diagram of a vehicle air suspension according to Example 7. In the present Example, a case where the vehicle air suspension is mounted on a vehicle such as a four-wheeled vehicle will be described as an example.

A vehicle body 3002 constitutes a body of the vehicle 3001. On the lower side of the vehicle body 3002, a total of four wheels 3003 that are left and right front wheels and left and right rear wheels are provided. The air suspension 3004 includes four air springs 3005 provided between the vehicle body 3002 and the wheels 3003, an air compressor 3006, a valve unit 3008, and a controller 3011. The air suspension 3004 adjusts the height of the vehicle by supplying compressed air from the air compressor 3006 to each air spring 3005 and discharging compressed air from each air spring 3005.

In the present Example, the linear motor 100 according to any one of the above-described Examples is used as a drive motor for the air compressor 3006. For example, the compressor 1000 according to Example 5 may be used as the air compressor 3006. The air compressor 3006 is connected to the valve unit 3008 via a supply/discharge pipeline (pipe) 3007. The valve unit 3008 is provided with four supply/discharge valves 3008a each including an electromagnetic valve and provided for each wheel 3003. A branch pipeline (pipe) 3009 is provided between the valve unit 3008 and each of the air springs 3005 of the wheels 3003. The air springs 3005 are connected to the air compressor 3006 via the branch pipeline 3009, the supply/discharge valves 3008a, and the supply/discharge pipeline 3007. Then, the valve unit 3008 opens and closes the supply/discharge valves 3008a according to a signal from the controller 3011 to supply and discharge compressed air to and from each air spring 3005 and adjust the height of the vehicle.

In the present Example, it is possible to suppress an increase in size of the air compressor 3006 constituting the air suspension 3004. Then, the mounting space for the air compressor 3006 in the vehicle 3001 can be reduced, and the degree of freedom in the arrangement of the air compressor 3006 is increased.

OTHER ASPECTS

In each Example, the moving magnet type in which the armature 3 is fixed and the field element (movable element 2) moves is exemplified, but a moving coil type in which the field element is fixed and the armature 3 moves may be used.

Instead of providing the magnetic pole teeth 301 in the top-bottom direction of the movable element 2, the magnetic pole teeth 301 may be provided on one side in the top-bottom direction of the movable element 2. In this case, one end of each of the arm portions 302 can be in contact with the floor surface of the soft magnetic material to support the cores 300.

In addition, the magnetic pole teeth 301, the arm portions 302, and the bridge 310 may be configured by stacking amorphous metal, or may be configured by a powder magnetic core. When the amorphous metal is used, there is an effect of reducing iron loss that occurs in the magnetic pole teeth 301, the arm portions 302, and the bridge 310, and when the powder magnetic core is used, the powder magnetic core can be three-dimensionally formed in an arbitrary shape.

In addition, the electromagnetic steel sheets can be stacked not in the front-rear direction but in the left-right direction. In that case, by integrally forming the cores 300 and the bridge 310, a magnetic flux from the core 300 to the adjacent core 300 through the bridge 310 can pass through the surfaces of the electromagnetic steel sheets, so that the magnetic resistance is reduced and the thrust of the linear motor can be improved. Furthermore, the weight of the linear motor can be reduced by configuring an armless linear motor obtained by removing the arm portions 302 is removed from the linear motor.

The present invention can be applied to various devices that relatively move the stator 1 and the movable element 2 in addition to the motor (linear motor). For example, the same effect can be obtained even when used in a generator, a compressor, an electromagnetic suspension, a positioning device, and the like.

Note that the present invention is not limited to the above-described Examples and includes various modifications. For example, the above-described Examples have been described in detail for easy understanding of the present invention, and are not necessarily limited to those having all the described configurations. In addition, a part of the configuration described in a certain Example can be replaced with the configuration described in the other Example, and the configuration described in a certain Example can be added to the configuration described in the other Example. In addition, for a part of the configuration of each Example, it is possible to add, delete, and replace another configuration.

REFERENCE SIGNS LIST 1 stator
2 movable element (field element)
3 armature
4 end member
5 winding
6 bearing
7 piston
8 cylinder
100 linear motor
200 magnetic pole frame
201 barrel part
202 neck part
203 gap
210 field element pole
211 primary magnet
212 secondary magnet
213 second secondary magnet
300 core
301 magnetic pole tooth (armature magnetic pole)
302 arm portion
310 bridge
600 bearing shaft
610 bearing bush
900 discharge valve
910 suction valve

The invention claimed is:
1. A linear motor comprising:
a field element including a magnetic pole frame and a plurality of field element poles provided in the magnetic pole frame; and
a plurality of armature magnetic poles around which windings are wound and that are provided to sandwich the field element, the field element and the armature magnetic poles are configured for a relative displacement, wherein the relative displacement comprises the field element moving within the linear motor from a center position to between a rearmost position and a stroke upper limit position,
wherein the plurality of field element poles include a primary magnet arranged between the plurality of armature magnetic poles and a first secondary magnet of the one or more secondary magnets arranged externally relative to spaces between the plurality of armature magnetic poles in either direction of the relative displacement, and
a neck part of the magnetic pole frame connected to a bearing is provided externally in the other direction of the relative displacement,
wherein a first pitch between the plurality of armature magnetic poles is first value $\tau p1$, a second pitch between the plurality of field element poles is second value $\tau p2$, and the second value $\tau p2$ is greater than the first value $\tau p1$, and wherein a distance between a bearing side pole of the plurality of armature magnetic poles and a primary pole of the primary magnet is half the first value τp1 when the field element is at the center position.

2. The linear motor according to claim 1, wherein the neck part includes a second secondary magnet of the one or more secondary magnets.

3. The linear motor according to claim 2, wherein the first secondary magnet and the second secondary magnet are provided asymmetrically with respect to a position of a linear center of the primary magnet in the direction of the relative displacement.

4. A compressor comprising:
a cylinder;
a piston that reciprocates inside the cylinder; and
a drive motor that drives the piston,
the compressor further comprising the linear motor according to claim 1 as the drive motor.

5. A refrigerator comprising a refrigerating compartment and a freezing compartment, the refrigerator being cooled when a refrigeration cycle is operated by driving of a compressor,
the refrigerator further comprising the compressor according to claim 4 as the compressor.

6. A vehicle air suspension mounted on a vehicle, the vehicle air suspension comprising:
an air spring provided between a vehicle body and a wheel; and
an air compressor that supplies and discharges compressed air to and from the air spring,
the vehicle air suspension further comprising the compressor according to claim 4 as the air compressor.

7. The linear motor according to claim 1, wherein the stroke upper limit position comprises a position where a piston of the field element collides with a wall surface of a cylinder of the linear motor.

8. The linear motor according to claim 7, wherein a collision value u is set for the relative displacement at a larger value than a thrust generation upper limit position τu to avoid a collision of the piston with the wall surface.

9. The linear motor according to claim 1, wherein a length of the first secondary magnet is determined with respect to a stroke of the relative displacement.

10. The linear motor according to claim 1, wherein the linear motor generate a thrust with respect to a ratio of lengths of a primary magnet and a first secondary magnet.

* * * * *